US012097559B2

(12) United States Patent
Lu et al.

(10) Patent No.: US 12,097,559 B2
(45) Date of Patent: Sep. 24, 2024

(54) ECCENTRIC EXTREME HIGH-SPEED-RATE LASER HYBRID MANUFACTURING METHOD FOR ROTARY ENGINEERING COMPONENT

(71) Applicant: Jiangsu University, Jiangsu (CN)

(72) Inventors: Jinzhong Lu, Jiangsu (CN); Xiang Xu, Jiangsu (CN); Kaiyu Luo, Jiangsu (CN); Jialong Du, Jiangsu (CN); Xingyu Bu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/273,270

(22) PCT Filed: Feb. 25, 2022

(86) PCT No.: PCT/CN2022/077959
§ 371 (c)(1),
(2) Date: Jul. 19, 2023

(87) PCT Pub. No.: WO2023/159477
PCT Pub. Date: Aug. 31, 2023

(65) Prior Publication Data
US 2024/0139813 A1 May 2, 2024

(30) Foreign Application Priority Data
Feb. 22, 2022 (CN) .......................... 202210161475.3

(51) Int. Cl.
*B22F 10/38* (2021.01)
*B22F 7/06* (2006.01)
(Continued)

(52) U.S. Cl.
CPC ............. *B22F 10/38* (2021.01); *B22F 7/062* (2013.01); *B22F 10/25* (2021.01); *B22F 10/31* (2021.01);
(Continued)

(58) Field of Classification Search
CPC .......... B22F 10/38; B22F 7/062; B22F 10/25; B22F 10/31; B22F 10/366; B22F 10/85;
(Continued)

(56) References Cited

U.S. PATENT DOCUMENTS

| 5,179,260 A | 1/1993 | Kroehnert | |
|---|---|---|---|
| 2020/0016703 A1* | 1/2020 | Maritano | ............... B23K 26/60 |

FOREIGN PATENT DOCUMENTS

| CN | 101468393 | 7/2009 |
|---|---|---|
| CN | 102179517 | 9/2011 |

(Continued)

OTHER PUBLICATIONS

Du et al., Microstructure and wear resistance of CoCrFeNiMn coatings prepared by extreme-high-speed laser cladding, Surface & Coatings Technology 470 (2023), https://doi.org/10.1016/j.surfcoat.2023.129821 (Year: 2023).*

(Continued)

*Primary Examiner* — Rebecca Janssen
(74) *Attorney, Agent, or Firm* — JCIPRNET (57) ABSTRACT

The present disclosure relates to an eccentric extreme high-speed-rate laser hybrid manufacturing method for a rotary engineering component. By positioning an extreme high-speed-rate laser direct energy deposition machining head at a predetermined eccentric distance, the damage caused by reflected light to the machining head is effectively reduced, to prolong a service life of the machining head. Also a conventional form of a molten pool in extreme high-speed-rate laser direct energy deposition can be changed, namely from a "falling" form caused by a high-speed movement and a gravity to a "climbing" form. Thus, in extreme high-speed-rate laser direct energy deposition machining, the molten (Continued)

pool has a longer time to fully contact a surface of the rotary engineering component to form desirable bonding performance.

7 Claims, 3 Drawing Sheets

(51) Int. Cl.
    *B22F 10/25*     (2021.01)
    *B22F 10/31*     (2021.01)
    *B22F 10/366*     (2021.01)
    *B22F 10/85*     (2021.01)
    *B33Y 10/00*     (2015.01)
    *B33Y 40/10*     (2020.01)
    *B33Y 50/02*     (2015.01)
    *B33Y 80/00*     (2015.01)

(52) U.S. Cl.
    CPC ............ *B22F 10/366* (2021.01); *B22F 10/85* (2021.01); *B33Y 10/00* (2014.12); *B33Y 40/10* (2020.01); *B33Y 50/02* (2014.12); *B33Y 80/00* (2014.12); *B22F 2007/068* (2013.01); *B22F 2998/10* (2013.01)

(58) Field of Classification Search
    CPC ........... B22F 2007/068; B22F 2998/10; B33Y 10/00; B33Y 40/10; B33Y 50/02; B33Y 80/00

See application file for complete search history.

(56) References Cited

FOREIGN PATENT DOCUMENTS

| | | | |
|---|---|---|---|
| CN | 108103498 | | 6/2018 |
| CN | 108220952 | | 6/2018 |
| CN | 111218684 | | 6/2020 |
| CN | 111501038 | | 8/2020 |
| CN | 111501038 A | * | 8/2020 |
| CN | 113957436 | | 1/2022 |
| CN | 113957436 A | * | 1/2022 ........... C23C 24/103 |

OTHER PUBLICATIONS

"International Search Report (Form PCT/ISA/210) of PCT/CN2022/077959," mailed on Nov. 24, 2022, pp. 1-4.

"Written Opinion of the International Searching Authority (Form PCT/ISA/237) of PCT/CN2022/077959," mailed on Nov. 24, 2022, pp. 1-4.

* cited by examiner (a)

«ECCENTRIC EXTREME HIGH-SPEED-RATE LASER HYBRID MANUFACTURING METHOD FOR ROTARY ENGINEERING COMPONENT

CROSS-REFERENCE TO RELATED APPLICATION

This application is a 371 of international application of PCT application serial no. PCT/CN2022/077959, filed on Feb. 25, 2022, which claims the priority benefit of China application no. 202210161475.3, filed on Feb. 22, 2022. The entirety of each of the above mentioned patent applications is hereby incorporated by reference herein and made a part of this specification.

TECHNICAL FIELD

The present disclosure relates to a technology combining extreme high-speed-rate laser direct energy deposition with extreme high-speed-rate laser remelting. The present disclosure belongs to the field of extreme additive manufacturing under an ultra-high kinetic energy driving condition, and particularly provides an eccentric extreme high-speed-rate laser hybrid manufacturing method for a rotary engineering component.

BACKGROUND

In high-speed-rate laser direct energy deposition, an additive material and a surface of a high-speed moving substrate material are molten simultaneously, with a high-energy-density beam, through synchronous powder feeding. The molten materials are solidified rapidly to form a deposition layer with an ultra-low dilution rate, and a metallurgical bond with the substrate. This greatly promotes a deposition rate and significantly improves wear resistance, corrosion resistance, heat resistance, oxidation resistance and the like of the surface of the substrate. The method is particularly applied to repair and remanufacture of shaft parts, and can also be used for machining on planes and complex curved surfaces. It has a broad application prospect in the fields of engineering machinery, aerospace, and metallurgy, and is envisioned as an environment-friendly remanufacturing process to replace conventional electroplating.

Rotary parts such as hydraulic supports in the coal mining industry, rollers in the metallurgical industry as well as pipes and upright posts for offshore platforms impose requirements on wear and corrosion resistance. Therefore, rotary parts are a main application field in the surface manufacturing industry. However, the existing extreme high-speed-rate laser direct energy deposition machining still has the following problems: In long-time extreme high-speed-rate laser direct energy deposition manufacturing on a surface of the long and large rotary engineering component, due to long-time reflection of laser, the service life of a core member (mainly a laser machining head) is greatly shortened. On the other hand, the surface molten pool moves away from a top of the rotary engineering component with the high-speed rotating substrate, and cannot be fully bonded with the substrate in short solidification time under the influence of a gravity. In addition, in the large-area extreme high-speed-rate laser direct energy deposition manufacturing of the large rotary engineering component, problems occur inevitably. The problems include manufacturing defects such as cracks and air holes on the deposition layer, and adhesion of semi-molten and unmolten particles on the surface of the coating are inevitable, causing a large surface roughness. This makes a workload heavy in subsequent secondary machining, and seriously increases a production cost of enterprises.

SUMMARY

In view of the above problems, an objective of the present disclosure is to provide an eccentric extreme high-speed-rate laser hybrid manufacturing method for a rotary engineering component, to solve a loss in a core member in extreme high-speed-rate laser direct energy deposition machining, a short action time between a molten pool and a substrate in machining, and a quality problem of a large rotary engineering component in large-scale manufacturing. While protecting the core member in the extreme high-speed-rate laser direct energy deposition, and prolonging the action time between the molten pool and the substrate, the extreme high-speed-rate laser hybrid manufacturing method can further improve compactness and overall performance of a deposition layer.

The eccentric extreme high-speed-rate laser hybrid manufacturing method includes the following steps:
step 1: pretreating a to-be-machined rotary engineering component, and clamping the to-be-machined rotary engineering component on an extreme high-speed-rate laser direct energy deposition machining tool;
step 2: adjusting and controlling with a manipulator, according to a diameter of the to-be-machined rotary engineering component and a diameter of a light outlet of an extreme high-speed-rate laser direct energy deposition machining head, a relative eccentric position between the light outlet of the extreme high-speed-rate laser direct energy deposition machining head and the rotary engineering component;
step 3: turning on an extreme high-speed-rate laser direct energy deposition machining system, and a powder-feeding system dedicated for extreme high-speed-rate laser direct energy deposition machining; selecting, according to repairing or surface strengthening requirements of the rotary engineering component, appropriate process parameters and special powder for the extreme high-speed-rate laser direct energy deposition machining; adjusting a laser spot focal plane and a powder convergence focal plane to coincide with each other; and locating, according to a dilution rate of a molten pool on a surface of the rotary engineering component, a coincident plane within a predetermined distance right above the to-be-machined rotary engineering component by positive defocusing;
step 4: compiling a machining program on a numerical control panel of the extreme high-speed-rate laser direct energy deposition machining system, performing the extreme high-speed-rate laser direct energy deposition machining to prepare a machined deposition layer with a desired thickness on the surface of the rotary engineering component, and allowing, after a first deposition layer is machined completely, the extreme high-speed-rate laser direct energy deposition machining head to automatically return to an initial position in the step 4;
step 5: adjusting, based on a surface of the machined deposition layer, a relative position between the light outlet of the extreme high-speed-rate laser direct energy deposition machining head and the surface of the machined deposition layer in a vertical direction;

step 6: turning on the extreme high-speed-rate laser direct energy deposition machining system again while keeping the powder-feeding system dedicated for the extreme high-speed-rate laser direct energy deposition machining closed, and selecting appropriate values of process parameters to perform extreme high-speed-rate laser remelting on the machined deposition layer; and step 7: repeating the steps 4, 5 and 6 according to overall thickness requirements on a surface repairing or strengthening layer of the rotary engineering component in practical engineering application, to prepare a deposition layer with excellent performance on the surface of the rotary engineering component.

Preferably, the extreme high-speed-rate laser direct energy deposition machining tool in the step 1 is a five-axis linkage numerical control machine tool, where in an X-axis, a maximum working stroke is 5,000 mm, and a movement speed is 0 mm/min to 10,000 mm/min; in a Y-axis, a maximum working stroke is 350 mm, and a movement speed is 0 mm/min to 10,000 mm/min; a maximum working stroke in a Z-axis is 600 mm; a spindle servo has a rotational speed of 0 r/min to 300 r/min; and a three-jaw chuck has a diameter of Φ640 mm.

Preferably, in the step 1, the pretreating the to-be-machined rotary engineering component is realized in two ways: for a rotary engineering component in need of surface repairing for a predetermined damage depth, an external circular surface is roughly turned first to remove a whole damaged portion; and for a rotary engineering component in need of surface strengthening, a surface is directly polished, cleaned with alcohol, and blow-dried.

Figure 1:
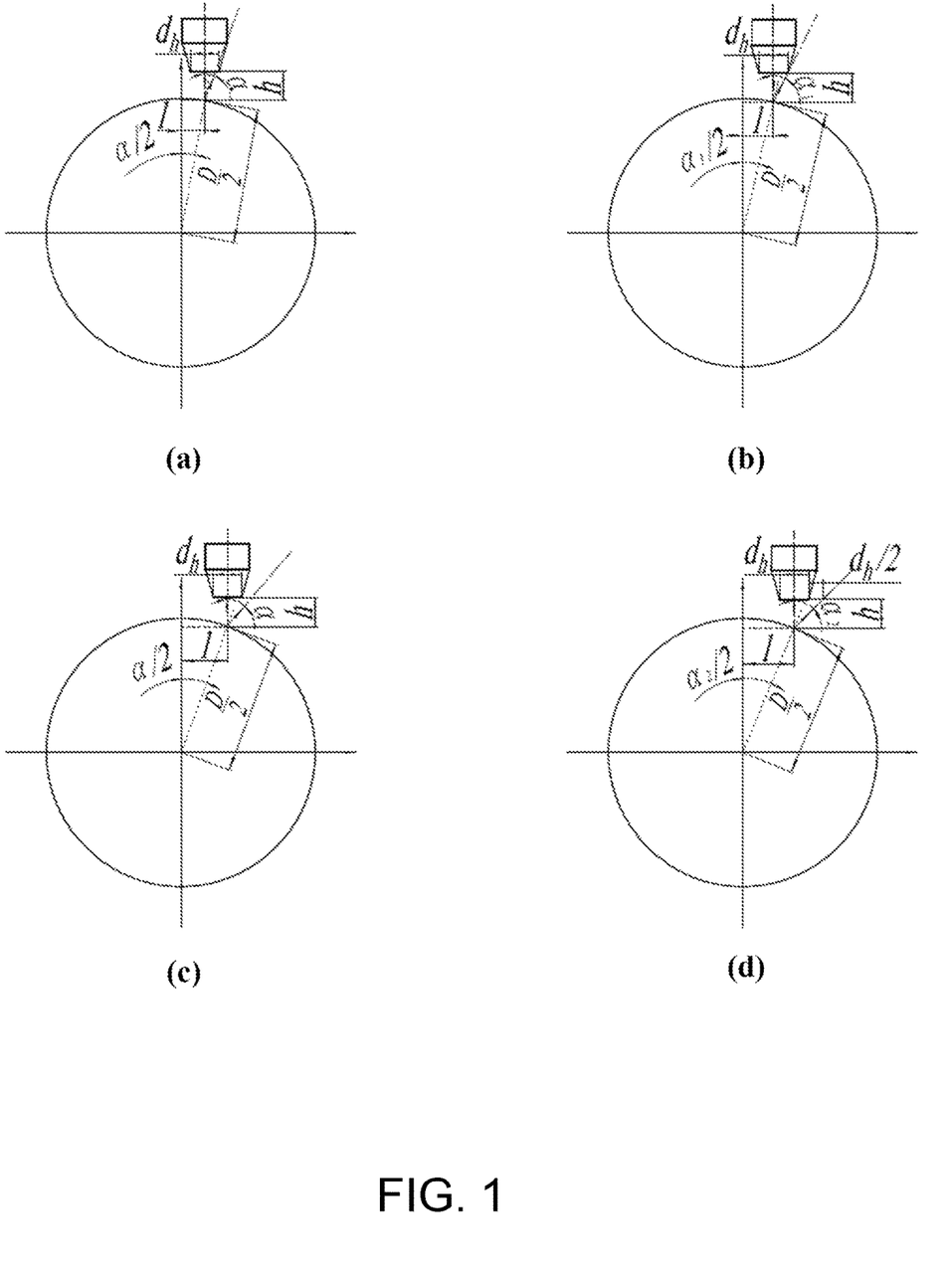
FIG. 1 is a schematic view illustrating an adjusting range of a relative eccentric position 1 between a light outlet of an extreme high-speed-rate laser machining head and a rotary engineering component according to the present disclosure, where (a): interference position reflected by a laser beam, (b): minimum eccentric position, (c): effective eccentric position, and (d): maximum eccentric position.

Preferably, in the step 2, the relative eccentric position between the light outlet of the extreme high-speed-rate laser direct energy deposition machining head and the rotary engineering component is a distance 1 (as shown in (a) of FIG. 1) between a midperpendicular of the extreme high-speed-rate laser direct energy deposition machining head and a midperpendicular of the to-be-machined rotary engineering component, where the diameter of the light outlet of the extreme high-speed-rate laser direct energy deposition machining head is dh, a height of a center of the light outlet of the extreme high-speed-rate laser direct energy deposition machining head above the to-be-machined rotary engineering component is h, the diameter of the to-be-machined rotary engineering component is D, and an included angle between an incidence direction and a reflection direction of a laser beam is α; and by defining $$\alpha_1 = \arctan\frac{d_h}{2h}$$

(b) of FIG. 1, and $$\alpha_2 = 2\arctan\frac{d_h}{2h}$$

(d) of FIG. 1, an adjusting range of 1 follows $\alpha_1 < \alpha \le \alpha_2$ (c) of FIG. 1, and an adjusting interval for the relative eccentric position between the light outlet of the extreme high-speed-rate laser direct energy deposition machining head and the rotary engineering component is set as $$1 \in \left(\frac{D}{2}\sin\left(\arctan\frac{d_h}{2h}\right), \frac{D}{2}\sin\left(2\arctan\frac{d_h}{2h}\right)\right].$$

Preferably, in the step 3, the appropriate process parameters for the extreme high-speed-rate laser direct energy deposition machining include a laser power of 2,000 W to 10,000 W, a laser spot diameter of 1.5 mm to 3 mm, a laser scanning linear speed of 333 mm/s to 2,000 mm/s, a deposition layer overlapping rate of 70% to 85%, and a shielding gas flow of 5 L/min to 20 L/min; and the powder-feeding system dedicated for the extreme high-speed-rate laser direct energy deposition machining includes a double-cylinder synchronous powder feeder, a stirring system, a heating system, an atmospheric flow adjustment device, and an anti-static tube, where a single-cylinder powder feeder of the double-cylinder synchronous powder feeder has a volume of 5 L, a powder feeding rate of 2 g/min to 150 g/min, and a powder feeding precision of ±2 g/min, and realizes long-distance transportation for 300 mesh to 600 mesh-powder; in extreme high-speed-rate laser direct energy deposition, the molten pool generally has a dilution rate of <8% on the surface of the rotary engineering component; and therefore, the coincident plane for the laser spot focal plane and the powder convergence focal plane is located within a distance of 3 mm to 10 mm right above an eccentric position of the to-be-machined rotary engineering component.

Figure 2:
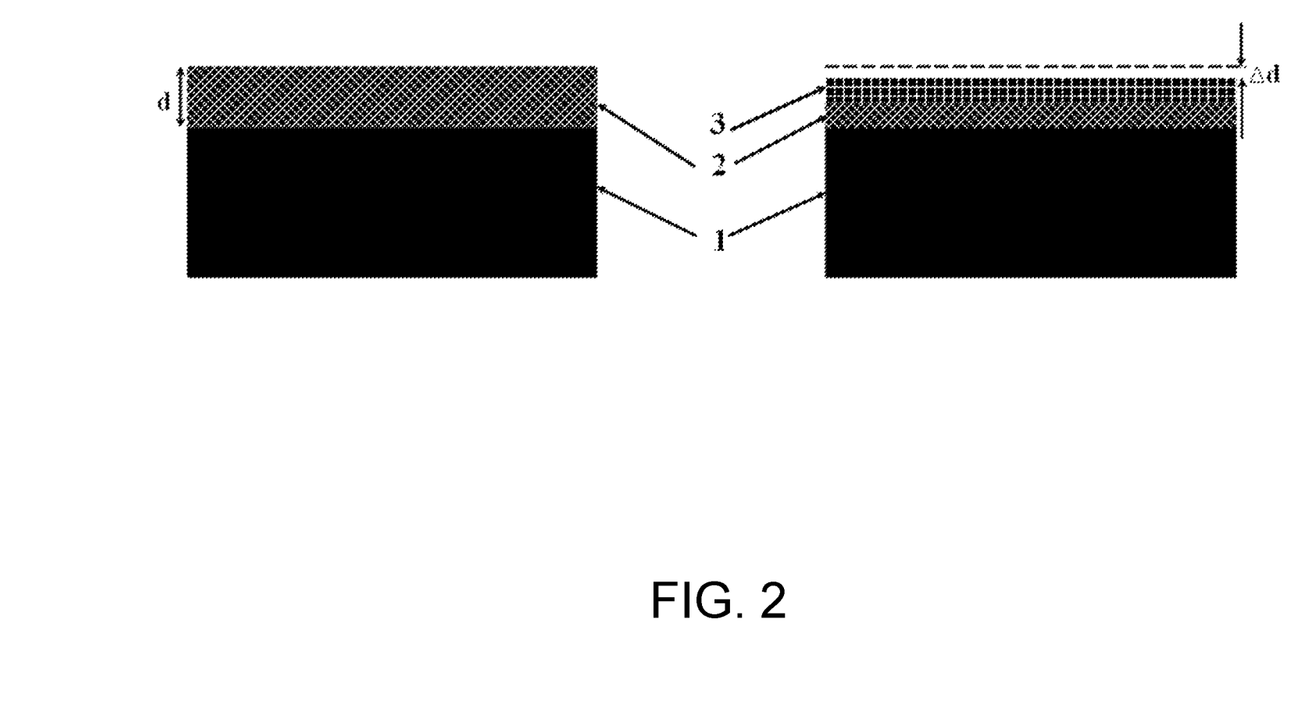
FIG. 2 is a schematic view illustrating a thickness variation of a deposition layer prepared with an eccentric extreme high-speed-rate laser hybrid manufacturing method for a rotary engineering component according to the present disclosure, where 1: rotary engineering component, 2: extreme high-speed-rate laser direct energy deposition layer in step 4, and 3: extreme high-speed-rate laser remelting layer in step 6.

Preferably, in the step 5, the relative position between the light outlet of the extreme high-speed-rate laser direct energy deposition machining head and the surface of the machined deposition layer is adjusted based on a thickness d of the machined deposition layer and a thickness variation Δd of the machined deposition layer upon the extreme high-speed-rate laser remelting (as shown in FIG. 2), that is, the extreme high-speed-rate laser direct energy deposition machining head is vertically upraised by a distance of d-Δd on the basis of the step 4.

Preferably, in the step 6, the process parameters in the extreme high-speed-rate laser remelting include a laser power and a laser scanning speed, and are adjusted based on an energy absorption value of the machined deposition layer, namely $$Q = \eta\frac{12P}{\pi d^2} \times e^{-\frac{12L^2}{d^2}},$$

where Q is effective laser energy absorbed by the machined deposition layer, P is the laser power, η is an absorptivity of a material of the machined deposition layer to a laser beam, d is a laser spot diameter, and L is an effective length of the molten pool formed on the surface of the machined deposition layer by the extreme high-speed-rate laser remelting; η is represented as $$\eta = \frac{2}{\sqrt{30}} \times \sqrt{\frac{R_{dz}}{\lambda}},$$

where Rdz is a resistivity of the machined deposition layer, and γ is a laser wavelength; and L is represented as $$\sqrt{\frac{d_o^2}{4} + (vt)^2},$$

where do is an actual diameter of the laser beam on the surface of the machined deposition layer, v is the laser scanning speed, and t is a solidification time of the molten pool.

According to the eccentric extreme high-speed-rate laser hybrid manufacturing method for the rotary engineering component provided by the present disclosure, by positioning an extreme high-speed-rate laser direct energy deposition machining head at a predetermined eccentric distance, not only can damage caused by reflected light to the machining head be effectively reduced to prolong a service life of the machining head, but also a conventional form of a molten pool in the extreme high-speed-rate laser direct energy deposition can also be changed, namely from a "falling" form caused by a high-speed movement and a gravity to a "climbing" form. Thus, in the extreme high-speed-rate laser direct energy deposition machining, the molten pool has longer time to fully contact a surface of the rotary engineering component to form desirable bonding performance. By combining the extreme high-speed-rate laser direct energy deposition with extreme high-speed-rate laser remelting, not only can surface quality and overall compactness of the deposition layer be effectively improved, but also a texture of the deposition layer can be homogenized to significantly improve overall performance of the repairing or strengthening deposition layer.

BRIEF DESCRIPTION OF THE DRAWINGS

TABLE 1 illustrates test results on tensile properties of extreme high-speed-rate laser direct energy deposition layers prepared in different eccentric conditions.

DETAILED DESCRIPTION OF THE EMBODIMENTS

In order to better illustrate the technical solutions of the present disclosure, specific implementations of the present disclosure are further described below in detail in conjunction with examples and accompanying drawings. However, the present disclosure is not limited to embodiments herein. All other embodiments obtained by a person of ordinary skill in the art based on the embodiments of the present disclosure without creative efforts shall fall within the protection scope of the present disclosure.

For example, a 27SiMn hydraulic piston rod in coal mine machinery is used as a substrate to prepare a strengthened deposition layer on a surface. The substrate has a diameter of 102 mm, and a length of 2 m. Special 17Cr4Ni2MoSi iron-based stainless steel powder is used for extreme high-speed-rate laser direct energy deposition. The powder has a particle size of 25 μm to 53 μm, and includes the following chemical components: 0.12% of C, 17.25% of Cr, 1.73% of Mo, 4.39% of Ni, 0.41% of Mn, 1.00% of Si, and the balance of Fe. Specific manufacturing steps are as follows:

Step 1: A to-be-strengthened hydraulic piston rod is polished with 600 #abrasive paper to remove impurities such as a surface scale, cleaned with alcohol, blow-dried and clamped on an extreme high-speed-rate laser direct energy deposition machining tool. A three-jaw chuck is used for clamping. The hydraulic piston rod is leveled with a radial dynamic balance instrument. At a rotational speed of 200 rpm, a radial jumped error is less than 5 μm.

Step 2: A relative position 1 between a light outlet of an extreme high-speed-rate laser direct energy deposition machining head and the hydraulic piston rod is adjusted and determined with a manipulator. In this embodiment, the light outlet of the extreme high-speed-rate laser direct energy deposition machining head has a diameter dh of 8 mm, a center of the light outlet of the extreme high-speed-rate laser direct energy deposition machining head has a height h of 18 mm above a hydraulic post, $\alpha 1=12.53°$, and $\alpha 2=25.06°$. Hence, an adjusting range of 1 follows $12.53°<\alpha \leq 25.06°$, and an adjusting interval of the relative eccentric position between the light outlet of the extreme high-speed-rate laser direct energy deposition machining head and the hydraulic piston rod is $1 \in (11.06, 21.60$ mm]. In the embodiment, 1 is respectively determined as 12 mm, 16 mm and 20 mm;

Step 3: An extreme high-speed-rate laser direct energy deposition system is turned on. A laser spot diameter of 2 mm, a laser power of 3,800 W, a scanning speed of 1,333 mm/s, a deposition layer overlapping rate of 75%, and a shielding gas flow of 6.5 L/min are set. The 17Cr4Ni2MoSi iron-based powder is dried for 2 h at 100° C. and put into two cylinders of a powder feeding system. A powder feeding rate of each of the two cylinders is 15 g/min. The two cylinders are turned on at the same time for powder feeding. In order that a molten pool has a dilution rate of less than 5% on a surface of the rotary engineering component, a laser spot focal plane and a powder convergence focal plane are adjusted to be coincide with each other. A coincident focal plane is located at 6 mm above an eccentric position of the hydraulic piston rod;

Step 4: A machining program is compiled on a numerical control panel of the extreme high-speed-rate laser direct energy deposition machining system according to a size of the hydraulic piston rod and the process parameters in the step 3. A laser and the extreme high-speed-rate laser direct energy deposition machining tool are turned on to prepare a machined deposition layer (as shown in (a) of FIG. 3) having a thickness of about 126 μm on a surface of the hydraulic piston rod. After a first deposition layer is machined completely, the extreme high-speed-rate laser direct energy deposition machining head automatically returns to an initial position in the step 4.

Step 5: Based on a surface of the machined deposition layer, a relative position between the light outlet of the extreme high-speed-rate laser direct energy deposition machining head and the surface of the machined deposition layer is adjusted in a vertical direction. Under the same laser power and scanning speed, hybrid machining was performed repeatedly to obtain test results. Upon extreme high-speed-rate laser remelting, a thickness of the extreme high-speed-rate laser direct energy deposition layer is reduced by 9 μm to 12 μm. Hence, on the basis of the step 4, the extreme high-speed-rate laser direct energy deposition machining head is vertically upraised by 114 μm to 117 μm;

Step 6: Based on existing research, the iron-based stainless steel has an absorptivity of about 0.35 to a laser beam, so Q is represented as $128.56P \times e^{-115.34L^2}$. With further measurement, an actual diameter of the laser beam on the surface of the deposition layer is 3.6 mm. However, since the extreme high-speed-rate laser direct energy deposition has a scanning speed of at least 1,000 mm/s, L is approximately represented as vt, and Q is further represented as $128.56P \times e^{-vt}$. That is, effective laser energy absorbed by the deposition layer is directly proportional to the laser power, but inversely proportional to the scanning speed. In the embodiment, no evident cracks or large holes are found in the single-layer deposition layer prepared by extreme high-speed-rate laser in the step 4, but a large number of unmolten or semi-molten powder particles are attached to a surface thereof. Hence, process parameters set in the extreme high-speed-rate laser remelting are mainly acted on a near-surface region of the extreme high-speed-rate laser direct energy deposition layer. Therefore, while the powder-feeding system dedicated for extreme high-speed-rate laser direct energy deposition machining is turned off, the extreme high-speed-rate laser direct energy deposition machining system is turned on. By setting the laser power as 2,850 W and the scanning speed as 1,333 mm/s, and keeping other process parameters unchanged, the extreme high-speed-rate laser remelting is performed on the machined deposition layer in the step 4 to obtain the single-layer deposition layer (as shown in (b) of FIG. 3) in the hybrid manufacturing.

Step 7: The steps 4, 5 and 6 are repeated according to overall thickness requirements on a surface strengthening layer of the rotary engineering component in practical engineering application, and a deposition layer with excellent performance is prepared on the surface of the rotary engineering component.

Figure 3:
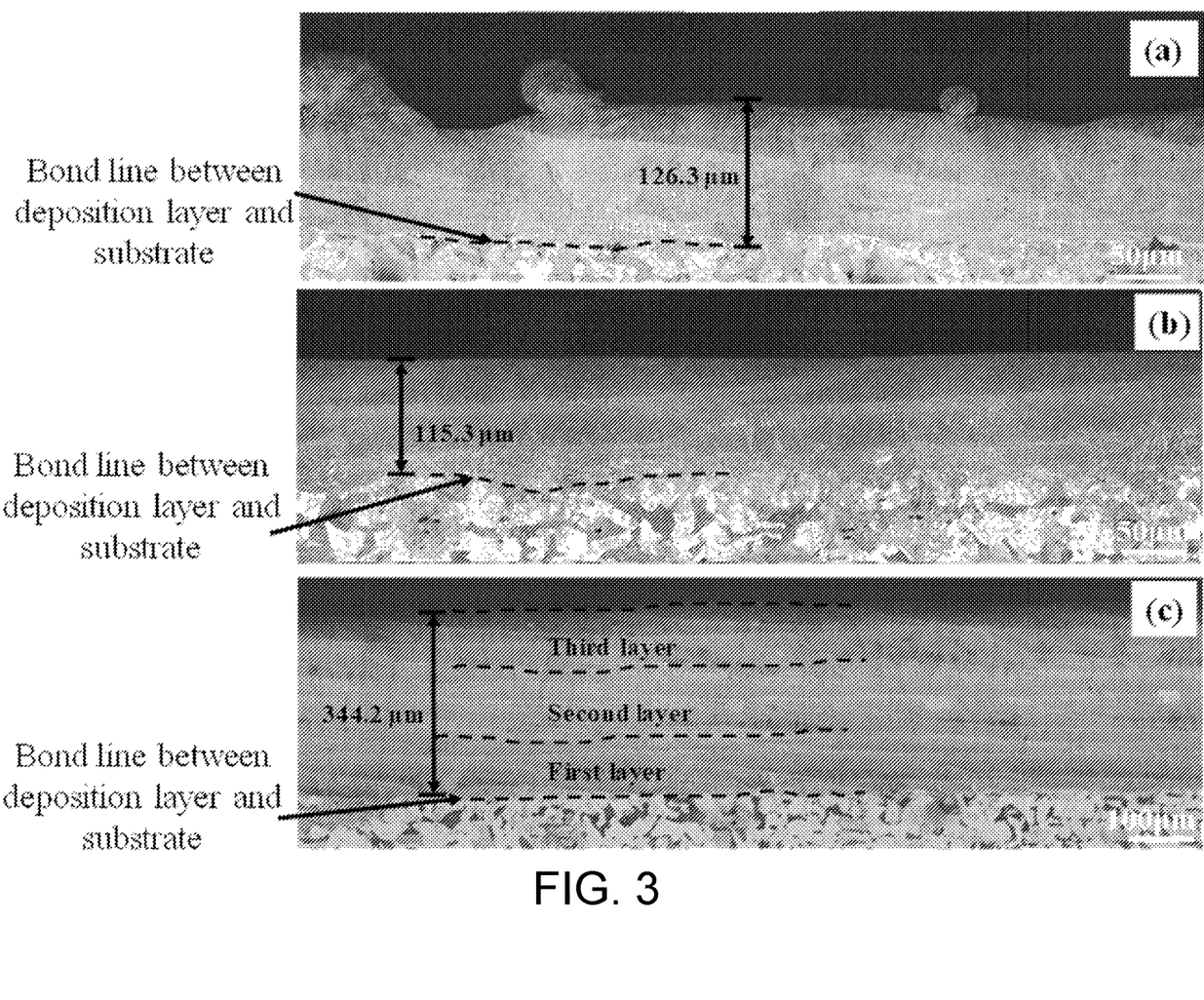
FIG. 3 is a schematic cross-sectional view illustrating a single-layer stainless steel deposition layer and a multi-layer stainless steel deposition layer prepared with an eccentric extreme high-speed-rate laser hybrid manufacturing method for a rotary engineering component according to the present disclosure, where (a): a single-layer deposition layer prepared by extreme high-speed-rate laser direct energy deposition, (b): a single-layer deposition layer prepared by extreme high-speed-rate laser direct energy deposition in combination with extreme high-speed-rate laser remelting, and (c): a multi-layer deposition layer prepared by extreme high-speed-rate laser direct energy deposition in combination with extreme high-speed-rate laser remelting.

In the embodiment, three deposition layers (as shown in (c) of FIG. 3) are prepared in total in the hybrid manufacturing. There are no evident air holes, cracks and other defects in the whole deposition layer.

FIG. 3 shows a microscopic image of a cross section of a deposition layer. For the extreme high-speed-rate laser composite deposition layer, the surface roughness is reduced by 60%, and the compactness is up to 99.8%. Table 1 shows a comparison of test results on mechanical properties of a deposition layer prepared with the technical method provided by the present disclosure and a deposition layer prepared without an eccentric condition. It is indicated that the technical method provided by the present disclosure can improve an interlayer bonding strength of the extreme high-speed-rate laser direct energy deposition layer by about 22%. In addition, without the eccentric condition, due to interference of reflected light, the extreme high-speed-rate laser direct energy deposition machining head is air-cooled after working continuously for 1 h, and a steel brush is then used to remove molten powder at the light outlet. This greatly reduces a production efficiency, and shortens a service life of the device. Therefore, with the technical solution provided by the present disclosure, not only can damage of the reflected light on the machining head be effectively reduced to prolong the service life, but defects such as adhesion of molten powder particles on the surface of the extreme high-speed-rate laser direct energy deposition layer, internal cracks and air holes and the like can also be removed obviously.

TABLE 1

| Eccentric distance l/mm | Ultimate tensile strength/MPa | Elongation/% |
| --- | --- | --- |
| 0 | 861 ± 11 | 1.25 ± 0.14 |
| 12 | 1017 ± 14 | 1.48 ± 0.13 |
| 16 | 1048 ± 12 | 1.55 ± 0.29 |
| 20 | 1033 ± 14 | 1.56 ± 0.27 |

It should be noted that it is obvious to those skilled in the art that the present disclosure is not limited to the details of the above exemplary embodiments, and that the present disclosure can be implemented in other specific forms without departing from the spirit or basic features of the present disclosure. Therefore, the embodiments should be regarded as exemplary and non-limiting in every respect. The scope of the present disclosure is defined by the appended claims rather than the above description, therefore, all changes falling within the meaning and scope of equivalent elements of the claims should be included in the present disclosure, and any reference numerals in the claims should not be construed as a limitation to the claims involved.

What is claimed is:

1. An eccentric extreme high-speed-rate laser hybrid manufacturing method for a rotary engineering component, comprising the following steps:

step 1: pretreating a to-be-machined rotary engineering component, and clamping the to-be-machined rotary engineering component on an extreme high-speed-rate laser direct energy deposition machining tool;

step 2: adjusting and controlling with a manipulator, according to a diameter of the to-be-machined rotary engineering component and a diameter of a light outlet of an extreme high-speed-rate laser direct energy deposition machining head, a relative eccentric position between the light outlet of the extreme high-speed-rate laser direct energy deposition machining head and the rotary engineering component;

step 3: turning on an extreme high-speed-rate laser direct energy deposition machining system, and a powder-feeding system dedicated for extreme high-speed-rate laser direct energy deposition machining; selecting, according to repairing or surface strengthening requirements of the rotary engineering component, appropriate process parameters and special powder for the extreme high-speed-rate laser direct energy deposition machining; adjusting a laser spot focal plane and a powder convergence focal plane to coincide with each other; and locating, according to a dilution rate of a molten pool on a surface of the rotary engineering component, a coincident plane within a predetermined distance right above the to-be-machined rotary engineering component by positive defocusing;

step 4: compiling a machining program on a numerical control panel of the extreme high-speed-rate laser direct energy deposition machining system, performing the extreme high-speed-rate laser direct energy deposition machining to prepare a machined deposition layer with a desired thickness on the surface of the rotary engineering component, and allowing, after a first deposition layer is machined completely, the extreme high-speed-rate laser direct energy deposition machining head to automatically return to an initial position in the step 4;

step 5: adjusting, based on a surface of the machined deposition layer, a relative position between the light outlet of the extreme high-speed-rate laser direct energy deposition machining head and the surface of the machined deposition layer in a vertical direction;

step 6: turning on the extreme high-speed-rate laser direct energy deposition machining system again while keeping the powder-feeding system dedicated for the extreme high-speed-rate laser direct energy deposition machining closed, and selecting appropriate values of process parameters to perform extreme high-speed-rate laser remelting on the machined deposition layer; and step 7: repeating the steps 4, 5 and 6 according to overall thickness requirements on a surface repairing or strengthening layer of the rotary engineering component in practical engineering application, to prepare a deposition layer with excellent performance on the surface of the rotary engineering component.

2. The eccentric extreme high-speed-rate laser hybrid manufacturing method for the rotary engineering component according to claim 1, wherein in the step 1, the extreme high-speed-rate laser direct energy deposition machining tool is a five-axis linkage numerical control machine tool, wherein in an X-axis, a maximum working stroke is 5,000 mm, and a movement speed is 0 mm/min to 10,000 mm/min; in a Y-axis, a maximum working stroke is 350 mm, and a movement speed is 0 mm/min to 10,000 mm/min; a maximum working stroke in a Z-axis is 600 mm; a spindle servo has a rotational speed of 0 r/min to 300 r/min; and a three-jaw chuck has a diameter of Φ640 mm.

3. The eccentric extreme high-speed-rate laser hybrid manufacturing method for the rotary engineering component according to claim 1, wherein in the step 1, the pretreating the to-be-machined rotary engineering component is realized in either of two ways: for a rotary engineering component in need of surface repairing for a predetermined damage depth, an external circular surface is roughly turned first to remove a whole damaged portion; and for a rotary engineering component in need of surface strengthening, a surface is directly polished, cleaned with alcohol and blow-dried.

4. The eccentric extreme high-speed-rate laser hybrid manufacturing method for the rotary engineering component according to claim 1, wherein in the step 2, the relative eccentric position between the light outlet of the extreme high-speed-rate laser direct energy deposition machining head and the rotary engineering component is a distance l between a midperpendicular of the extreme high-speed-rate laser direct energy deposition machining head and a midperpendicular of the to-be-machined rotary engineering component, wherein the diameter of the light outlet of the extreme high-speed-rate laser direct energy deposition machining head is $d_h$, a height of a center of the light outlet of the extreme high-speed-rate laser direct energy deposition machining head above the to-be-machined rotary engineering component is h, the diameter of the to-be-machined rotary engineering component is D, and an included angle between an incidence direction and a reflection direction of a laser beam is $\alpha$; and by defining $$\alpha_1 = \arctan\frac{d_h}{2h} \text{ and } \alpha_2 = 2\arctan\frac{d_h}{2h},$$

an adjusting range of l follows $\alpha_1 < \alpha \le \alpha_2$, and an adjusting range for the relative eccentric position between the light outlet of the extreme high-speed-rate laser direct energy deposition machining head and the rotary engineering component is set as $$l \in \left(\frac{D}{2}\sin\left(\arctan\frac{d_h}{2h}\right), \frac{D}{2}\sin\left(2\arctan\frac{d_h}{2h}\right)\right].$$

5. The eccentric extreme high-speed-rate laser hybrid manufacturing method for the rotary engineering component according to claim 1, wherein in the step 3, the appropriate process parameters for the extreme high-speed-rate laser direct energy deposition machining comprise a laser power of 2,000 W to 10,000 W, a laser spot diameter of 1.5 mm to 3 mm, a laser scanning linear speed of 333 mm/s to 2,000 mm/s, a deposition layer overlapping rate of 70% to 85%, and a shielding gas flow of 5 L/min to 20 L/min; and the powder-feeding system dedicated for the extreme high-speed-rate laser direct energy deposition machining comprises a double-cylinder synchronous powder feeder, a stirring system, a heating system, an atmospheric flow adjustment device, and an anti-static tube, wherein a single-cylinder powder feeder of the double-cylinder synchronous powder feeder has a volume of 5 L, a powder feeding rate of 2 g/min to 150 g/min, and a powder feeding precision of ±2 g/min, and realizes long-distance transportation for 300 mesh to 600 mesh-powder; and the coincident plane for the laser spot focal plane and the powder convergence focal plane is located within a distance of 3 mm to 10 mm right above an eccentric position of the to-be-machined rotary engineering component.

6. The eccentric extreme high-speed-rate laser hybrid manufacturing method for the rotary engineering component according to claim 1, wherein in the step 5, the relative position between the light outlet of the extreme high-speed-rate laser direct energy deposition machining head and the surface of the machined deposition layer is adjusted based on a thickness d of the machined deposition layer and a thickness variation Δd of the machined deposition layer upon the extreme high-speed-rate laser remelting, that is, the extreme high-speed-rate laser direct energy deposition machining head is vertically upraised by a distance of d−Δd based on the initial position in the step 4.

7. The eccentric extreme high-speed-rate laser hybrid manufacturing method for the rotary engineering component according to claim 1, wherein in the step 6, the process parameters in the extreme high-speed-rate laser remelting comprise a laser power and a laser scanning speed, and are adjusted based on an energy absorption value of the machined deposition layer, namely $$Q = \eta\frac{12P}{\pi d^2} \times e^{-\frac{12L^2}{d^2}},$$

wherein Q is effective laser energy absorbed by the machined deposition layer, P is the laser power ranges from 2000 W-10000 W, η is an absorptivity of a material of the machined deposition layer to a laser beam, d is a laser spot diameter ranges from 1.55-3 mm, and L is an effective length of the molten pool formed on the surface of the machined deposition layer by the extreme high-speed-rate laser remelting; η is represented as $$\eta = \frac{2}{\sqrt{30}} \times \sqrt{\frac{R_{dz}}{\lambda}},$$

wherein $R_{dz}$ is a resistivity of the machined deposition layer, and γ is a laser wavelength; and L is represented as $$\sqrt{\frac{d_o^2}{4} + (vt)^2},$$

wherein $d_o$ is an actual diameter of the laser beam on the surface of the machined deposition layer, v is the laser scanning speed ranges from 333-2000 mm/s, and t is a solidification time of the molten pool.

* * * * *